United States Patent
Hoff, Jr.

(10) Patent No.: US 10,968,659 B2
(45) Date of Patent: Apr. 6, 2021

(54) WEDGE-LOCK SAFE-T-PULLER

(71) Applicant: Robert Dwaine Hoff, Jr., Cleveland, TX (US)

(72) Inventor: Robert Dwaine Hoff, Jr., Cleveland, TX (US)

( * ) Notice: Subject to any disclaimer, the term of this patent is extended or adjusted under 35 U.S.C. 154(b) by 337 days.

(21) Appl. No.: 15/133,164

(22) Filed: Apr. 19, 2016

(65) Prior Publication Data

US 2017/0297877 A1 Oct. 19, 2017

(51) Int. Cl.
*E04H 17/26* (2006.01)
*A01G 17/16* (2006.01)

(52) U.S. Cl.
CPC ........... *E04H 17/265* (2013.01); *A01G 17/16* (2013.01)

(58) Field of Classification Search
CPC .......... E04H 17/265; E02D 9/02; B25B 5/00; B25B 5/147; A01G 17/16
See application file for complete search history.

(56) References Cited

U.S. PATENT DOCUMENTS

| | | | | |
|---|---|---|---|---|
| 4,422,621 A | * | 12/1983 | Ekern | E04H 17/265 254/30 |
| 4,721,335 A | * | 1/1988 | Krenek, Jr. | E04H 17/265 254/132 |
| 6,095,498 A | * | 8/2000 | Lemoine | B25B 27/026 254/30 |
| 2007/0090332 A1 | * | 4/2007 | Mensi | E04H 17/265 254/30 |
| 2007/0183121 A1 | * | 8/2007 | Futrell | E04H 17/265 361/600 |
| 2012/0279737 A1 | * | 11/2012 | Trethewey | A01G 17/16 173/29 |
| 2016/0222695 A1 | * | 8/2016 | Hoovler | E04H 17/265 |

* cited by examiner

*Primary Examiner* — Daniel J Colilla
(74) *Attorney, Agent, or Firm* — Elliott & Polasek, PLLC; Douglas H. Elliott; Nathan Q. Huynh

(57) ABSTRACT

The Wedge-Lock Safe-T-Puller is a tool that provides a safe and simple way to extract a T-post. The tool uses a captured sliding shackle that travels along a wedge to provide a positive grip between the bumps on a T-post and the Post Alignment Groove on the post side of the Wedge-Lock. Using a lifting shackle or sling attached to the lifting eye at the top of the tool, force is exerted vertically, causing the tool with its wedge to slide up the T-post thereby tightening the sliding shackle against the front of the T-post. This sliding action causes the wedge and sliding shackle to "lock" together to grip the T-post. The greater the force applied, the tighter the wedge and shackle grip. The Wedge-Lock Safe-T-Puller is intended to be operated with mechanical lifting equipment such as a front-end loader, track hoe, backhoe, Skid Steer Loader, etc. The tool may also be used in conjunction with lever and stand type manual or hydraulic extractors.

16 Claims, 4 Drawing Sheets

WEDGE-LOCK SAFE-T-PULLER

CROSS REFERENCES

D 725,979 April 2015 Breedan, III
U.S. Pat. No. 8,701,791 April 2014 Page
U.S. Pat. No 8,465,004 June 2013 Fly
U.S. Pat. No. 8,375,606 February 2013 Ford
U.S. Pat. No. 8,230,944 July 2012 Thiem
U.S. Pat. No. 8,166,676 May 2012 Ford
U.S. Pat. No. 7,963,051 October 2010 Ford
U.S. Pat. No. 7,290,754 November 2007 Mensi
U.S. Pat. No. 7,185,880 March 2007 McCray
U.S. Pat. No. 7,125,000 October 2006 Saavedra et al.
U.S. Pat. No. 6,669,172 December 2003 Bearden
U.S. Pat. No. 6,352,242 March 2002 Medearis
Des. 431,431 October 2000 Allen et al.
U.S. Pat. No. 5,794,919 August 1998 Price
U.S. Pat. No. 5,681,030 October 1997 Nall
Des. 372,177 July 1996 Hansen
U.S. Pat. No. 5,499,795 March 1996 Mathews
U.S. Pat. No. 5,464,192 November 1995 Burnham
U.S. Pat. No. 5,242,152 September 1993 Schatz
U.S. Pat. No. 5,224,687 July 1993 Geckler
Des. 337,412 June 1993 Ruggles
Des. 312,196 November 1990 Norona
U.S. Pat. No. 4,738,433 April 1998 Hoff
U.S. Pat. No. 4,726,565 February 1988 Keller
U.S. Pat. No. 4,555,090 November 1985 Averhoff
U.S. Pat. No. 4,161,310 July 1979 Parker
U.S. Pat. No. 3,779,516 December 1973 King
U.S. Pat. No. 3,525,502 August 1970 Fisher
U.S. Pat. No. 2,994,510 August 1961 Michalak
U.S. Pat. No. 2,777,726 January 1957 Lundgren et al.

BACKGROUND OF THE INVENTION

1. Field of the Invention

This invention relates to the Wedge-Lock Safe-T-Puller, an invention for the safe and secure removal T-Posts.

2. Description of the Art

Livestock and temporary fencing is often erected using T-posts, a steel post having a t shaped cross section with molded bumps to aid in keeping fence wire in place. This post design is easily installed with a post pounder or other means to drive the posts into the soil without digging postholes. While easy to install, these posts typically require some type of mechanical removal.

Removal of T-posts generally requires substantial mechanical force to effect extraction. Although many designs and options are effective at removing posts, most of the options have inherent safety concerns. Chains, slings, and u-shaped devices do work but can slip or jump in the pulling process. This can lead to substantial hand, eye, or other injuries. The Wedge-Lock Safe-T-Puller (once set) allows the T-post to be pulled hands free, thereby providing a safe and secure way to remove T-posts.

The Wedge-Lock Safe-T-Puller fills the needs for a safe and secure T-Post removal tool and method.

SUMMARY OF THE INVENTION

The Wedge-Lock Safe-T-Puller is a tool that provides a safe and simple way to extract a T-post. The tool uses a captured sliding shackle that travels along a sliding wedge to provide a positive grip between the bumps on a T-post and the Post Alignment Groove on the post side of the Wedge-Lock. Using a lifting shackle or sling attached to the lifting eye at the top of the tool, force is exerted vertically, causing the tool with its wedge to slide up the T-post thereby tightening the sliding shackle against the front of the T-post. This sliding action causes the wedge and sliding shackle to "lock" together to grip the T-post. The greater the force applied, the tighter the wedge and shackle grip. The Wedge-Lock Safe-T-Puller is intended to be operated with mechanical lifting equipment such as a front-end loader, track hoe, backhoe, crane, etc. The tool may also be used in conjunction with lever and stand type manual or hydraulic extractors.

DETAILED DESCRIPTION OF THE EMBODIMENT

Figure 1:
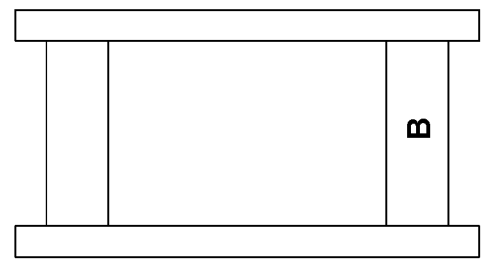
FIG. 1 is a 2D cad-drawing showing the Wedge-Lock Safe-T-Puller from a side profile.
Figure 1:
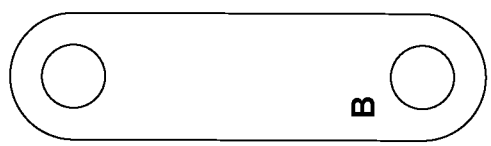
Figure 1:
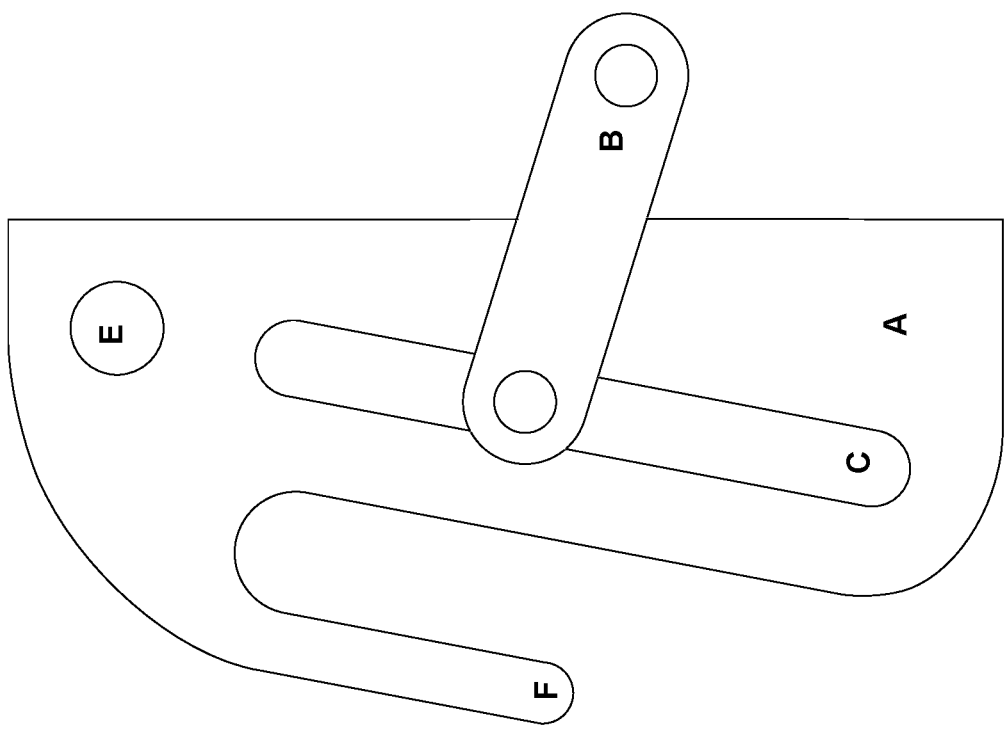
Figure 1:
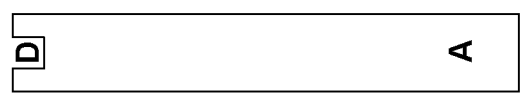

Referring to FIG. 1, the Wedge-Lock Safe-T-Puller is comprised of two separate pieces; the Wedge-Lock sliding wedge (FIG. 1 A) and the sliding shackle (FIG. 1 B). Both pieces work in harmony to effect the safe and efficient removal of T-Posts.

The Wedge-Lock sliding wedge (FIG. 1 A) contains several features to make it effective. The Wedge Slot (FIG. 1 C) houses the captured sliding shackle (FIG. 1 B) and permits free range of travel. This slot causes the wedging effect necessary to create tension between the T-Post and the Sliding Shackle (FIG. 1 B).

Figure 2:
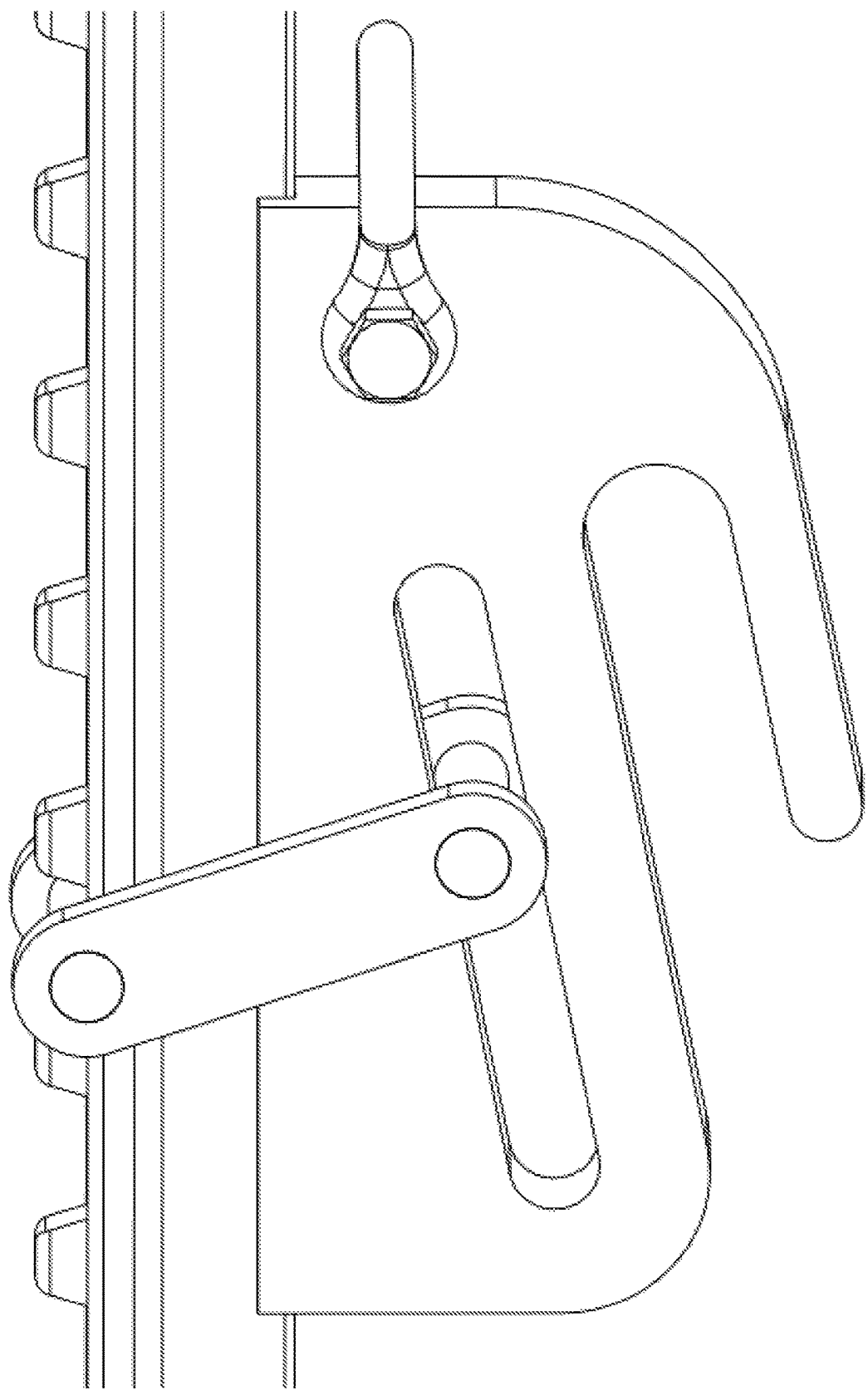
FIG. 2 is a 2D cad-drawing showing the Wedge-Lock Safe-T-Puller post alignment groove.
Figure 3:
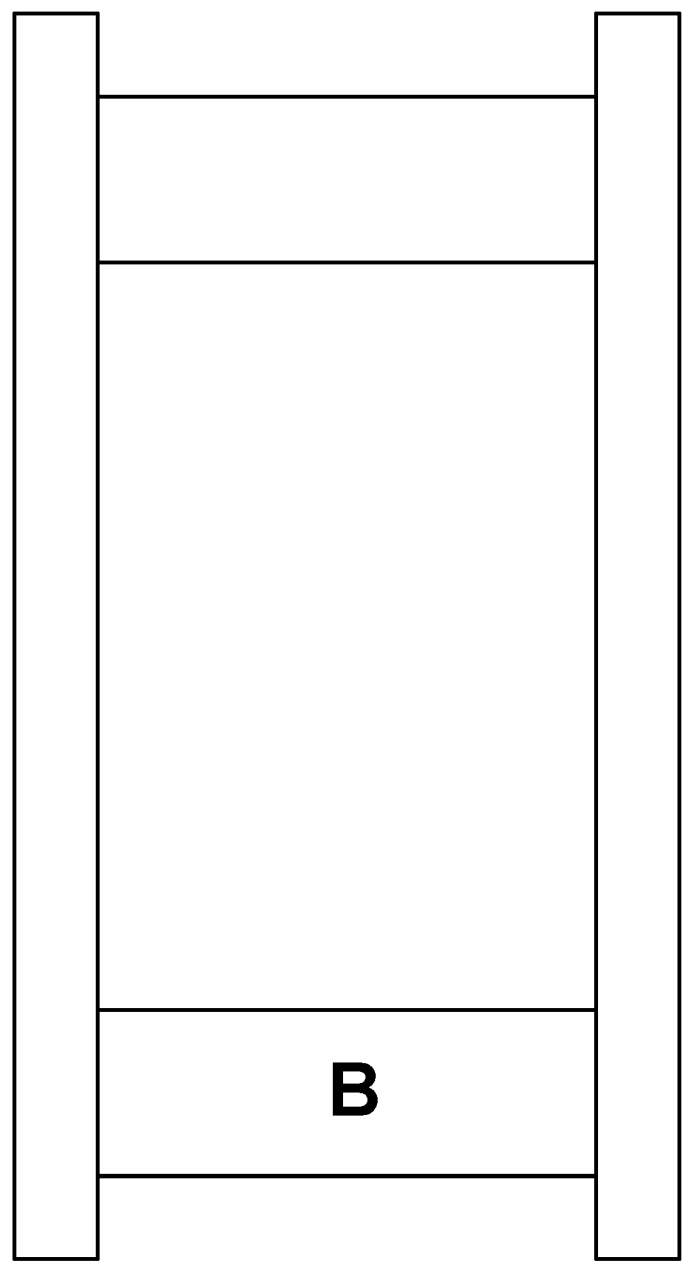
FIG. 3 is a 2D cad-drawing showing the Wedge-Lock Safe-T-Puller sliding shackle assembly.

The Wedge-Lock sliding wedge (FIG. 1 A) also contains a u-shaped Post Alignment Groove (FIG. 2 D). Post Alignment Groove (FIG. 2 D) holds the T-Post in longitudinal alignment with the Wedge-Lock Safe-T-Puller to provide maximum energy transfer and straight-line force. This grove is critical to proper alignment of the post, and in assuring the post is not bent and is reusable after removal.

The Wedge-Lock sliding Wedge (FIG. 1 A) also contains a Safe-T-Handle (FIG. 1 F) for safe positioning of the Wedge-Lock Safe-T-Puller. The Safe-T-Handle (FIG. 1 F) is not intended for mechanical lifting. The Safe-T-Handle is open ended to facilitate easy hand removal once the Wedge-Lock Safe-T-Puller is attached to the post and slack removed from the strap.

Figure 4:
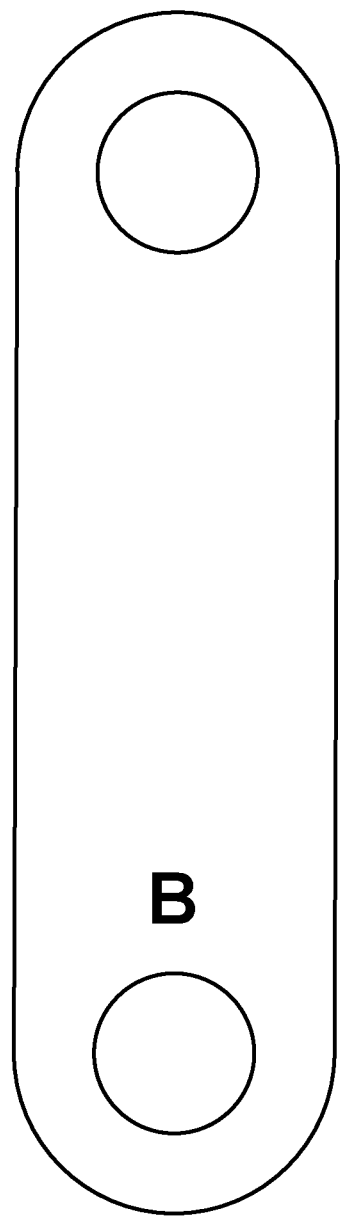
FIG. 4 is an artist rendering of how the Wedge-Lock Safe-T-Puller would be attached to a T-Post.

The Wedge-Lock sliding wedge (FIG. 1 A) also has a Lifting Eye (FIG. 1 E) for attaching a standard lifting shackle. The Lifting Eye (FIG. 1 E) may be used with a shackle or a small sling, strap, or choker as available. The Wedge-Lock Safe-T-Puller is intended to be lifted with a ¾" Shackle and a load rated nylon strap as shown in FIG. 4.

Be it hereby noted and understood that the present invention is not limited to the embodiments described above. The invention encompasses any and all embodiments in conjunction with the following claims.

I claim:

1. A method for pulling a T-post from the ground, comprising:
   providing a post pulling tool, comprising:
   (a) a wedge piece having a top, a bottom, a post side that includes a u-shaped groove extending vertically from the top to the bottom for alignment of the tool and post, and a handle side;
   (b) a rigid handle;
   (c) a slot disposed in the wedge piece between the top and bottom of the wedge piece and also between the post side and the handle side of the wedge piece; and
   (d) a shackle piece having a first plate with a first internal surface, a second plate with a second internal surface, a first member extending through the slot between the first internal surface and the second internal surface, and a second member extending between the first internal surface and the second internal surface;
   positioning the shackle piece so a portion of the T-post is disposed between the first and second internal surfaces and also between the first and second members;
   positioning the second member of the shackle piece against the side of the T-post farthest away from the wedge piece;
   moving the shackle piece from a position closer to the upper portion of the slot to a position closer to the lower portion of the slot; and
   lifting the post pulling tool to pull the T-post from the ground.

2. The method of claim 1, wherein a portion of the wedge piece is disposed between the first member and the second member.

3. The method of claim 1, wherein a portion of the T-post is capable of being disposed between the first member and the second member.

4. The method of claim 1, wherein a portion of the wedge piece is disposed between the first plate and the second plate.

5. The method of claim 1, wherein a portion of the slot is disposed between the first plate and the second plate.

6. The method of claim 1, wherein, when the post side is disposed against the T-post, the slot and an edge of the T-post form an angle.

7. The method of claim 1, wherein the first member is cylindrical.

8. The method of claim 1, wherein the first member is capable of being slid along the slot.

9. The method of claim 1, wherein the first member is abutted against the wedge piece.

10. The method of claim 1, wherein the second member is cylindrical.

11. The method of claim 1, wherein the second member is capable of being abutted against a portion of the T-post.

12. The method of claim 1, wherein the slot is disposed between the top and bottom of the wedge piece.

13. The method of claim 1, wherein the slot is disposed between the post side and the handle side of the wedge piece.

14. The method of claim 1, wherein the slot has an upper portion and a lower portion.

15. The method of claim 1, wherein an upper portion of the slot is closer than a lower portion of the slot to the top of the wedge piece.

16. The method of claim 1, wherein an upper portion of the slot is closer than a lower portion of the slot to the post side of the wedge piece.

* * * * *